Figure 1:
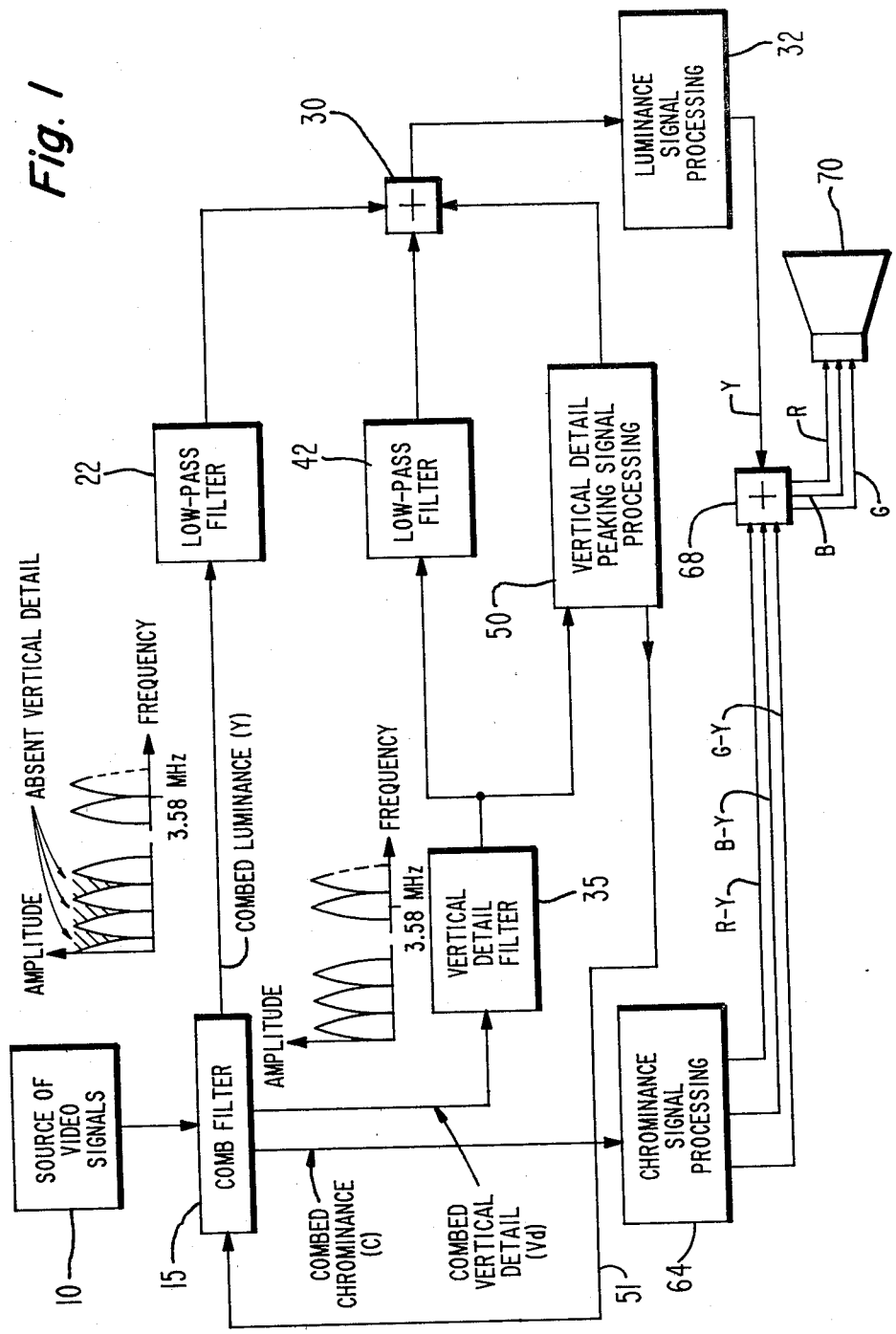

United States Patent [19]

Lagoni

[11] 4,454,533
[45] Jun. 12, 1984

[54] VERTICAL DETAIL CORING CIRCUIT TO TRACK A GAIN ADJUSTED SIGNAL

[75] Inventor: William A. Lagoni, Indianapolis, Ind.

[73] Assignee: RCA Corporation, New York, N.Y.

[21] Appl. No.: 323,059

[22] Filed: Nov. 19, 1981

[51] Int. Cl.³ .......................................... H04N 9/535
[52] U.S. Cl. ...................................... 358/31; 358/36; 358/37; 358/166
[58] Field of Search ...................... 358/31, 37, 39, 36, 358/21 R, 166; 333/74

[56] References Cited

U.S. PATENT DOCUMENTS

| | | | |
|---|---|---|---|
| 4,096,516 | 6/1978 | Pritchard | 358/31 |
| 4,224,638 | 9/1982 | Pritchard | 358/31 |
| 4,245,237 | 1/1981 | Lagoni | 358/31 |
| 4,316,210 | 2/1982 | Wharton | 358/166 |
| 4,350,995 | 9/1982 | Harlan | 358/37 |
| 4,365,266 | 12/1982 | Lagoni | 358/37 |
| 4,402,006 | 8/1983 | Karlock | 358/31 |

Primary Examiner—Tommy P. Chin
Attorney, Agent, or Firm—Eugene M. Whitacre; P. M. Emanuel; R. H. Kurdyla

[57] ABSTRACT

A coring circuit is provided in a system which includes a gain controlled device. The diodes which produce the coring effect are biased by a signal which is related to the gain control signal coupled to the device. In this way, the coring threshold is made to vary relative to changes in the amplitude of the applied signal so that the percentage of coring remains fixed over a range of applied signal amplitude levels.

14 Claims, 2 Drawing Figures

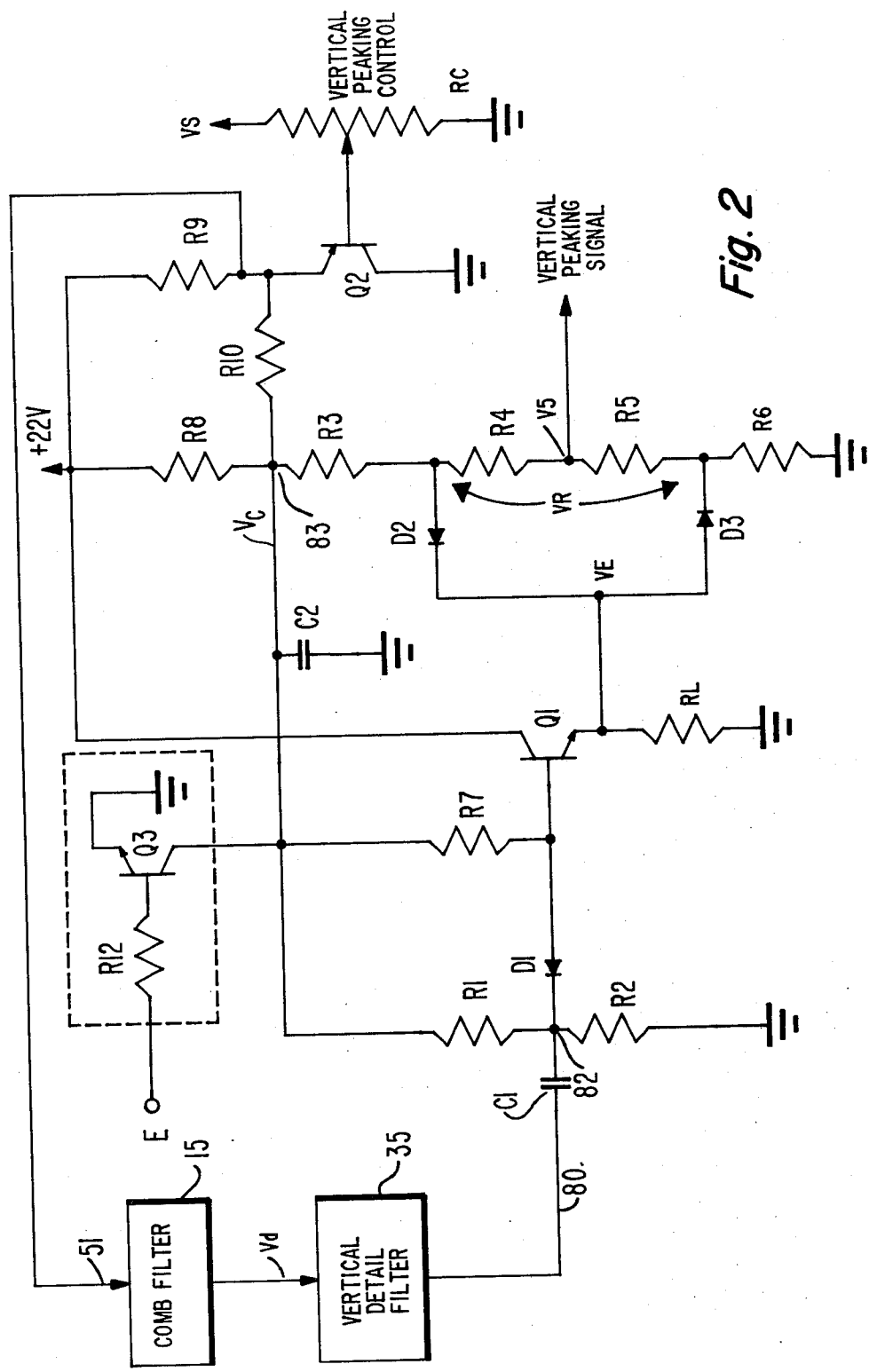

VERTICAL DETAIL CORING CIRCUIT TO TRACK A GAIN ADJUSTED SIGNAL

The present invention relates generally to a coring circuit and, more particularly, to a coring circuit which is adaptively controlled relative to a gain control circuit.

In a color television system such as the NTSC standard system developed by the United States, the luminance and chrominance components of a color television signal are disposed within the video frequency spectrum in frequency interleaved relation, with the luminance components at integral multiples of the horizontal line scanning frequency and the chrominance components at odd multiples of one-half the line scanning frequency. Various comb filter arrangements for separating the frequency interleaved luminance and chrominance components of the video signal are known, for example, from U.S. Pat. No. 4,143,397 (D. D. Holmes) and U. S. Pat. No. 4,096,516 (D. H. Pritchard).

A combed luminance signal which appears at the luminance output of the comb filter has been subjected to a "combing" effect over its entire band. The combing action over the high frequency band portion which is shared with chrominance signal components has the desired effect of deleting chrominance signal components. Extension of this combing action into the low frequency band portion which is not shared with the chrominance signal components, however, is not needed to effect the desired removal of chrominance signal components, and serves only to unnecessarily delete luminance signal components. Components in the lower end of the unshared band which are subject to such deletion are representative of "vertical detail" luminance information. Preservation of such vertical detail is desirable to avoid loss of vertical resolution in the luminance content of a displayed image.

One arrangement for preserving the vertical detail information employs a low pass filter coupled to the output of the comb filter at which the "combed" chrominance component appears. The upper cut-off frequency of this filter lies below the band occupied by the chrominance signal component (with an illustrative choice being just below 2 MHz). The filter selectively couples signals below the chrominance band from the chrominance output of the comb filter to a combining network where the selectively coupled signals are summed with combed luminance output signals from the comb filter. The combined signal includes a "combed" high frequency portion (occupying a band of frequencies above the filter cut-off frequency) from which chrominance signal components have been removed, and an uncombed (i.e., "flat") low frequency portion in which all luminance signal components have been preserved.

It is sometimes desirable to enhance or peak the vertical detail information of a displayed image by adding back to the luminance signal a greater amount of the vertical detail signal than is required to restore the luminance signal to its original form (i.e., a "flat" amplitude characteristic). The additional vertical detail signal then serves to emphasize vertical detail information so as to enhance picture detail resolution. For low level luminance signals, however, such enhancement tends to produce objectionable visible effects when noise interference is present and is undesirably enhanced along with the vertical detail information of the luminance signal.

Also in this instance, alternate line set-up variations (ALSUV) when present in the video signal are also undesirably enhanced. The ALSUV phenomenon is a form of low level signal interference manifested by variations in the black level of the video signal from line-to-line, and may be caused by misalignment of signal processing systems at the broadcast transmitter, for example. The ALSUV interference is particularly noticeable for low level video signals of about five percent of the maximum expected video signal amplitude, and produces objectionable visible effects on a reproduced image. These visible effects are undesirably magnified when vertical detail enhancement is provided.

In U.S. Pat. No. 4,245,237 (W. A. Lagoni), a vertical detail enhancement arrangement is described which provides a means for controlling the amount of signal enhancement under a variety of conditions so that in the region of small video signal amplitudes the enhancement signal is essentially cored whereas in a region of higher video signal amplitudes there is an amplification of the enhancement signal and in yet another region of higher amplitude video signals the enhancement signal is somewhat attenuated or pared. This arrangement, described in the aforementioned Lagoni patent, then has the desirable net result of avoiding the ALSUV problem by coring out low level interference, providing enhanced vertical detail in a mid-range of video signal amplitudes and trimming back on the vertical enhancement signal when the video signal is high in amplitude and it is not necessary to enhance the vertical detail.

Despite the good results achieved by the abovedescribed system, under certain conditions a problem can arise which is not addressed by that system. Certain broadcast transmitters have been known to transmit the ALSUV type interference signals at amplitude levels which are beyond the fixed coring levels set in the Lagoni system. This is undesirable because such components may fall in the second region where they will be enhanced. It would not be a desirable solution to merely set up higher fixed coring levels since at least some percentage of the very signals which it is desired to enhance would be lost.

Thus, under certain conditions it may be desirable to provide a control so that the user will have the ability to turn down the vertical enhancement when a situation such as the transmission of very high ALSUV arises. Beyond this, it is desirable to give the user such a control so that adjustments to the level of vertical enhancement or peaking may be made to fit individual user preferences.

It is also desirable to be able to provide coring of the vertical detail enhancement signal and to have this coring arranged to be adaptive in such a way that the percentage of coring would remain substantially constant in the presence of a varying amplitude vertical detail signal.

It turns out that certain comb filter integrated circuits of the type useful in the previously mentioned Lagoni patent, and actually used in commercially available TV receivers which use the Lagoni arrangement, have a gain control feature. That is, the circuits are arranged to accept a signal which is applied to amplifiers in the vertical detail channel of the circuit to control the gain of this channel.

Thus, in consideration of all of these factors, it may be desirable to vary the coring threshold as a function of the vertical detail gain control signal in the context of a receiver which provides a user control over the vertical detail enhancement signal. The invention, described in detail herein, accomplishes this result, and, changes the coring threshold substantially linearly with respect to changes of the gain control signal.

To state the problem in another way, assume that the user wishes to turn down his vertical peaking or enhancement signal via his control. If there were a fixed coring threshold, then the cored portion of the signal would represent a larger or increasing percentage of the total vertical peaking signal. These higher coring percentages would then remove more of the beneficial elements of the vertical peaking signal. Therefore it is desired to utilize a coring circuit whereby the coring threshold is variable with the vertical detail gain control voltage. In this way, it is possible to reduce the amplitude of the vertical detail signal and the coring threshold in a linearly related fashion so that the percentage of coring remains substantially the same.

In accordance with the present invention a circuit is provided which has a first means for translating certain signals with a variable gain in response to a gain control signal. A second means, coupled to the first means, is provided for coring the signal provided by the first means. A third means is coupled to the first and to the second means for providing the gain control signal for controlling the amplitude of the certain signals and for controlling the threshold level of the coring performed in the second means.

IN THE DRAWING

FIG. 1 is a partial block diagram of a TV receiver which utilizes the present invention; and FIG. 2 is a diagram showing the details of a variable threshold coring circuit for use with the TV receiver of FIG. 1.

In FIG. 1, a source of composite color video signals 10 including luminance and chrominance components supplies video signals to an input of a comb filter 15 of known configuration, such as a comb filter employing charge coupled devices (CCD's) as shown in U.S. Pat. No. 4,096,516. The luminance and chrominance components are arranged within the video signal frequency spectrum in frequency interleaved relation. The luminance component has a relatively wide bandwidth (extending from D.C. or zero frequency to about four megahertz). The upper frequency range of the luminance component is shared with the chrominance component, which comprises a subcarrier signal of 3.58 MHz which is amplitude and phase modulated with color information. The amplitude versus frequency response of comb filter 15 with respect to luminance combing action exhibits a peak amplitude response at integral multiples of the horizontal line scanning frequency (approximately 15,734 Hz), extending from D.C. or zero frequency, and an amplitude null at odd multiples of one-half the line scanning frequency, including the 3.58 MHz chrominance subcarrier frequency. The amplitude versus frequency response of comb filter 15 with respect to chrominance combing action exhibits a peak amplitude response at odd multiples of one-half the line frequency, including 3.58 MHz, and an amplitude null at integral multiples of the line frequency.

A "combed" luminance signal (Y) from the luminance output of comb filter 15 is coupled via a low pass filter 22 to a first input of a signal combining network 30. Filter 22 is arranged to pass all luminance signals below a cut-off frequency of approximately 4 MHz, and serves to remove noise and clock frequency components of switching signals associated with the switching operation of comb filter 15 when of a CCD type comb filter.

A "combed" chrominance signal (C) from the chrominance output of comb filter 15 is applied to a chrominance signal processing unit 64 for generating R-Y, B-Y and G-Y color difference signals, and another "combed" signal Vd to an input of a low pass vertical detail filter 35. Unit 64 includes a suitable filter for passing only those signal frequencies from comb filter 15 which occupy the band of chrominance signal frequencies. Filter 35 exhibits a cut-off frequency of approximately 1.8 MHz, and selectively passes those signal frequencies present in the combed chrominance signal output of comb filter 15 which lie below this cut-off frequency. Signal frequencies in this region represent vertical detail luminance information which is absent from the combed luminance signal and which must be restored to the luminance signal to avoid loss of vertical resolution in the luminance content of a displayed image. Such vertical detail restoration as well as controlled vertical detail enhancement, fixed coring and paring may be accomplished as described in U.S. Pat. No. 4,245,237.

Comb filter 15 is of the type, as previously mentioned, which includes provision for controlling the amplitude of the vertical detail output signal Vd. A gain control signal is provided on line 51 to a terminal of comb filter 15. The generation of the signal on line 51 will be described in greater detail in connection with FIG. 2.

Vertical detail signals from the output of filter 35 exhibit a linear transfer function and are translated via a signal path including a low pass filter 42, to a second input of a combining network 30. Low pass filter 42 exhibits a cut-off frequency of approximately 2 MHz. Vertical detail signals from filter 35 also are supplied to a vertical detail peaking signal processing apparatus 50 which among other things, provides coring of the vertical detail peaking signals. The other functions of unit 50 may be those described in U.S. Pat. No. 4,245,237 relative to non-linear translation and paring. Processed signals from unit 50 are supplied to a third input of combiner 30, where they are summed with the signals coupled via filter 42 and with the combed luminance signal.

The output signal from combiner 30 corresponds to a reconstituted luminance component of the video signal with the vertical detail information thereof restored, and controllably enhanced. The reconstituted luminance component is afterwards coupled to a luminance signal processing unit 32. An amplified luminance signal Y from unit 32 and the color difference signals from chrominance unit 64 are combined in a matrix 68 for providing, R, B, and G color image representation output signals. These signals are then suitably coupled to image intensity control electrodes of a color kinescope 70.

FIG. 2 shows a particular circuit in accordance with the present invention which forms part of the circuitry found in the vertical detail peaking signal processing unit 50. The circuitry shown in FIG. 2 provides a coring function wherein the coring threshold is made to vary in response to a user actuated vertical detail peaking control. Again, the threshold is varied in a way such that the percentage of coring remains the same despite changes in the amplitude of the vertical detail enhancement signals over a range of controlled changes.

In FIG. 2 the signals from the vertical detail filter 35 are provided to the processing unit 50 via line 80. These signals are A.C. coupled via capacitor C1 to a junction point 82 between resistors R1 and R2. Junction point 82 is connected to the cathode of diode D1. The anode of diode D1 is connected to the base electrode of the emitter follower connected transistor Q1. Resistor R7 is connected between the anode of diode D1 and one end of resistor R1. The collector of Q1 is connected to a positive supply voltage of 22 volts and the emitter electrode is connected to ground potential via the emitter load resistor RL.

Oppositely poled diodes D2 and D3 are connected to the emitter electrode of transistor Q1 and provide the coring function as will be described herein.

Resistors R3, R4, R5 and R6 are connected in series between a circuit point 83 and ground potential. The anode of diode D2 is connected between resistors R3 and R4 and the cathode of diode D3 is connected between Resistors R5 and R6. Capacitor C2 is connected between point 83 and ground potential. The resistor string of R3-R6 is connected via resistor R8 from point 83 to the positive supply voltage. The cored vertical peaking signal is provided at the junction between R4 and R5.

A second transistor Q2 has its collector electrode connected to ground potential, its emitter electrode connected via resistor R9 to the positive supply voltage and its base electrode connected to the wiper terminal of a potentiometer $R_C$. The emitter electrode of transistor Q2 is also connected to point 83 via resistor R10. The main terminals of the potentiometer are connected between a supply voltage VS and ground potential. Potentiometer $R_C$ and the associated circuitry forms the user control which provides a signal at the emitter of Q2 which is provided to the amplifier stages of the comb filter 15 via line 51 to ultimately control the amplitude of the vertical detail signal on line 80.

The operation of the circuit may best be explained in the context of a specific example. In the arrangement of FIG. 2, the comb filter 15 has a gain characteristic such that when the signal on line 51 is at about 0.7 volts, the comb filter amplifiers are at maximum gain and the largest vertical detail signal is provided on line 80. When the signal on line 51 is changed through the operation of the peaking control to 12.0 volts, this corresponds to zero gain in the comb filter and the smallest signal is put out on line 80. The coring threshold control may now be viewed from the point of view of the voltage $V_C$ supplied to the junction point 83. When $V_C$ is very small (less than 0.7 volts), the coring threshold should be set at its maximum whereas when $V_C$ is at about 12.0 volts, the coring threshold should be about zero. This defines the extreme limits. That is, when the signal on line 80 is large in magnitude it is desired to core or remove say 5 percent of the signal. When the signal on line 80 goes down in amplitude, as a result of the user operation of the vertical peaking control, the threshold of coring must be reduced so that even with small amplitude signals on line 80 only 5 percent of that small signal will be cored.

This result is achieved in the following fashion. When the vertical detail gain control signal on line 51 is 12.0 volts, the voltage $V_C$ is made to be about 12.0 volts and this is made to correspond to the value of $V_R$ (drop across R4-R5) which biases the diodes D2 and D3 relative to the emitter voltage $V_E$ sufficient to make these diodes appear as ON switches and thus produce near zero coring.

Now, as the peaking control is changed to 0.7 volts on line 51, the voltage $V_C$ is lowered to the amount necessary to produce the maximum desired coring threshold, e.g., 5 percent of the signal on line 80. If the resistors producing $V_R$ (i.e., R4 and R5) are of equal value and if the voltage $V_E$ at the emitter of transistor Q1 is made to track the voltage V5 as $V_C$ is changed, then the coring will be symmetrical about the V5 level and should change linearly since $V_E$ and $V_C$ are changing linearly relative to each other.

The diode D1, connected in the emitter-base circuit of transistor Q1, is used to compensate for the $V_{BE}$ drop of Q1 such that if the ratio of R1/R2 is proportional to the ratio (R3+R4)/(R5+R6), then VE will equal V5 over the desired range of VC. Diode D1 will also provide temperature compensation for the base-emitter junction of transistor Q1.

As can now be seen from FIG. 2, when the user adjusts the peaking control potentiometer such that the voltage VC is relatively small, the signal on line 80 is large, and the coring threshold is large. However, when the user adjusts the control such that the voltage VC is high, say at about 12.0 volts, the signal on line 80 is small, and, the coring threshold is set near zero. Now since the voltages producing the biasing for the diodes D2 and D3 comes from voltages which linearly track each other, i.e., namely VE and VR, the coring threshold will change linearly and the percentage of coring relative to the applied signal on line 80 will remain constant.

In the case of the FIG. 2 arrangement, the coring will be symmetrical relative to V5. The cored vertical peaking signal is now available for further processing and eventual delivery to the summing apparatus 30 shown in FIG. 1.

The circuit of FIG. 2 can be further modified to provide another advantageous result. There are occasions when the received television signal may contain undesired horizontally oriented line patterns. Some examples of these undesired signals are co-channel interference which can produce a 10.5 KHz or 21 KHz beat in the luminance signal. The presence of such signals can be detected, for example, by the use of a series of bandpass filters coupled to the luminance channel to detect the presence of the interference signals, and, then the circuit of FIG. 2 can be used to increase the coring threshold.

This beneficial result can be achieved in the context of FIG. 2 by reducing the value of VC inversely with the amount of undesired signal. Reduction of VC causes a reduction of VR which reduces the forward bias on diodes D2 and D3 thereby allowing a larger signal in the vertical detail channel to pass while discriminating against the smaller noise signals.

Implementation of this result is achieved through the use of NPN transistor Q3 with its collector electrically connected to point 83 (voltage level VC), its emitter electrode connected to ground potential and its base electrode adapted to receive the signal E, which is directly related to the incoming interference signal, via resistor R12.

As can be seen in FIG. 2, when the signal E increases in amplitude the value of the voltage VC goes down, causing VR to go down which, in turn, increases the coring threshold to get rid of the interference signals in the vertical detail enhancement channel.

The two controls described in connection with FIG. 2, i.e., the user controlled potentiometer and the interference detection circuit each operate to reduce the influence of undesired elements in the visual output display.

What is claimed is:

1. A circuit for processing certain signals comprising:
   first means for translating said certain signals with a variable gain in response to a gain control signal;
   second means coupled to said first means for coring the signals provided by said first means; and
   third means coupled to said first and to said second means for providing said gain control signal for controlling the amplitude of said certain signals and for controlling the threshold level of the coring performed in said second means.

2. The circuit according to claim 1 wherein said third means comprises a potentiometer having first and second main terminals connected between a supply voltage and a reference potential and further having a control terminal connected to the control electrode of a transistor, said transistor having first and second main electrodes and said control electrode, said gain control voltage being provided at one of the main electrodes of said transistor.

3. The circuit according to claim 2 wherein said second means comprises a pair of oppositely poled diodes and a resistive network.

4. The circuit according to claim 3 wherein said first means includes a gain controlled filter.

5. Video image vertical detail signal processing apparatus in a system for processing a video signal containing image representative luminance and chrominance components disposed within a frequency spectrum of said video signal in frequency interleaved relation, said system including a comb filter means for providing at a first output a combed luminance signal and for providing at a second output a combed vertical detail signal, said comb filter means being responsive to a gain control signal applied to said comb filter means, and wherein signals provided at said second output include signal frequencies representative of vertical detail information absent from said combed luminance signal at said first output, said apparatus comprising:
   first means coupled to said second output of said comb filter means for selectively passing said signal frequencies corresponding to vertical detail signal information;
   second means responsive to the output signal from said first means for providing a second signal corresponding to said vertical detail information signal at a first circuit point;
   third means connected to said first circuit point for coring said second signal, the threshold level of said coring being variable; and
   fourth means for providing said gain control signal to said comb filter means for controlling the amplitude of said combed vertical detail signal and for providing a signal related to said gain control signal to said third means for varying said coring threshold level such that said coring threshold level is a substantially fixed percentage of the amplitude of said second signal over a range of amplitudes of said second signal.

6. The apparatus according to claim 5 wherein said third means comprises first and second diodes each having an anode and a cathode, the cathode of said first diode and the anode of said second diode being connected to said first circuit point, the anode of said first diode being connected to a second circuit point via a first resistor, the cathode of said second diode being connected to said second circuit point via a second resistor, and means for biasing said first and second diodes such that the signal at said second circuit point is cored at threshold levels which represent a fixed percentage of the amplitude of the second signal at said first circuit point over a range of amplitude values of the second signal at said first circuit point.

7. The apparatus according to claim 6 wherein said first and second resistors are of equal value.

8. The apparatus according to claim 7 wherein said means for biasing said diodes comprises third and fourth resistors connected in serial relationship with said first and second resistors between a third circuit point and a point of reference potential, and, wherein said fourth means includes means for providing said signal related to said gain control signal to said third circuit point.

9. The apparatus according to claim 8 wherein said means for providing said signal related to said gain control signal to said third circuit point comprises:
   a transistor having first and second main electrodes and a control electrode;
   means for providing a variable signal between said control electrode and said first main electrode, said gain control signal being provided at said second main electrode; and
   means connected between said second main electrode and said third circuit point for providing to said third circuit point said signal related to said gain control signal.

10. A circuit for processing video signals, said circuit comprising:
    a gain controlled device for providing said video signals at an output terminal thereof with amplitude levels controlled by a gain control signal applied to said device;
    a first transistor having first and second main electrodes and a control electrode, said first main electrode thereof being connected to a source of supply potential, said second main electrode thereof being connected to a point of reference potential via a load resistor;
    means for coupling the signals at the output terminal of said gain controlled device to the control electrode of said first transistor;
    first and second diodes each having a cathode electrode and an anode electrode, the cathode of the first diode and the anode of said second diode being connected to the second main electrode of said first transistor;
    first, second, third and fourth resistors connected in series between a first circuit point and a point at said reference potential;
    the anode electrode of said first diode being connected to the junction between said first and second resistors and the cathode electrode of said second diode being connected to the junction between said third and fourth resistors;
    means for connecting said first circuit point to said source of supply potential;
    a second transistor having first and second main electrodes and a control electrode, said first main electrode thereof being connected via a resistor to said source of supply potential, said second main electrode thereof being connected to a point at said reference potential;

means for connecting said first main electrode of said second transistor to said first circuit point;

means for connecting said first main electrode of said second transistor to said gain control device for providing said gain control signal thereto; and means, including a potentiometer and a voltage source, for providing a controllable potential to the control electrode of said second transistor;

said circuit responding to changes in potential supplied to the control electrode of said second transistor for altering the amplitude of the signals coupled to the control electrode of said first transistor and for altering the threshold levels for the foward biasing of said diodes such that the signal appearing at the junction between said second and third resistors is cored at substantially a fixed percentage of the amplitude of the signals coupled to the control electrode of said first transistor over a range of amplitude of the signal so coupled.

11. The circuit according to claim 10 further comprising fifth and sixth resistors serially connected between said first circuit point and a point at said reference potential, the junction between said fifth and sixth resistors being electrically connected to the control electrode of said first transistor and wherein the ratio of the fifth resistor to the sixth resistor is proportional to the value of the ratio of the sum of the first and second resistors over the sum of the third and fourth resistors, and wherein the second and third resistors are of equal value.

12. The circuit according to claim 11 further comprising a third diode connected between the control electrode of said first transistor and the junction between said fifth and sixth transistors for providing temperature compensation for the semiconductor junction between the control and second electrodes of said first transistor.

13. The circuit according to claim 10 further comprising means connected to said first circuit point and responsive to the presence of interference signals for altering the threshold level for the forward biasing of said diodes.

14. The circuit according to claim 13 wherein said means for altering comprises another transistor having first and second main electrodes and a control electrode, one main electrode thereof being connected to said first circuit point, the second main electrode thereof being connected to said point of reference potential, and, the control electrode thereof being adapted to receive a signal indicative of the presence of said interfering signals.

* * * * *